March 18, 1969 W. M. HUBBARD 3,433,979

MAJORITY POWER SENSOR

Filed March 28, 1967 Sheet 1 of 3

INVENTOR
W. M. HUBBARD
BY
Sylvan Sherman
ATTORNEY

March 18, 1969 W. M. HUBBARD 3,433,979

MAJORITY POWER SENSOR

Filed March 28, 1967 Sheet 2 of 3

United States Patent Office 3,433,979
Patented Mar. 18, 1969

3,433,979
MAJORITY POWER SENSOR

William M. Hubbard, Middletown Township, Monmouth County, N.J., assignor to Bell Telephone Laboratories Incorporated, Murray Hill, N.J., a corporation of New York Continuation-in-part of application Ser. No. 546,366, Apr. 29, 1966. This application Mar. 28, 1967, Ser. No. 633,340
U.S. Cl. 307—235 5 Claims
Int. Cl. H03k 5/20

ABSTRACT OF THE DISCLOSURE

This application discloses apparatus for determining which of two alternating current signals is larger. In one embodiment, a pair of diodes whose current-voltage characteristics include a negative resistance region, are connected series-aiding across a balanced timing pulse source and biased below their negative resistance regions.

In the presence of unequal signals and a timing pulse, the diode subjected to the larger signal switches to an operating point above its negative resistance region. The polarity of the resulting output pulse identifies the switched diode. Devices of this type are advantageously utilized as regenerative-detectors in differentially-coherent phase modulation PCM systems.

In a second mode of operation, the apparatus functions as a differential detector indicating the difference in the powers of two alternating current signals.

A strip transmission line embodiment of the invention, adapted for operation at high bit rates, is disclosed.

This invention relates to apparatus for determining which of two alternating current signals is larger, and for generating an output signal whose polarity is determined thereby. Devices of this type are particularly useful as regenerators in differentially-coherent phase modulation communications systems.

*Cross reference to related applications*

This application is a continuation-in-part of my copending application Ser. No. 546,366, filed Apr. 29, 1966 and now abandoned.

*Background of the invention*

One of the more significant advantages of a pulse code modulation transmission system is the ability to reconstruct the transmitted pulse train after it has traveled through a dispersive, noisy medium. This regenerative process is performed at intervals along the transmission path by means of regenerative repeaters.

Typically, detection and pulse regeneration are achieved independently, requiring two separate stages to perform these two separate functions. It is an object of the present invention to combine these two steps into a single operation and a single regenerative detector stage.

*Summary of the invention*

In accordance with the present invention, the two alternating current signal components that are being compared, are sampled by a pair of negative resistance diodes. The diodes, which are connected series-aiding, are characterized by current-voltage characteristics having a first positive resistance region, a negative resistance region, and a second positive resistance region, and includes, as an example, the so-called tunnel diode.

In operation, each diode is biased at an operating point within its first positive resistance regions, which is below the negative resistance region. In addition, the diodes are simultaneously subjected to timing pulses and to the alternating current signals that are to be compared.

The timing pulses have a polarity and amplitude to shift the operating points of the two diodes towards their respective negative resistance regions. However, the diode to which the larger signal component is applied develops the larger total current and, as a consequence, this diode reaches its negative resistance region first. This results in the operating point of this diode switching from a point along its first positive resistance region to a point along its second positive resistance region. When this switching occurs, there is a corresponding drop in the voltage across the other diode which prevents the second diode from switching. Thus, switching can occur only in the diode to which the larger signal component is applied.

When a diode switches, the accompanying sudden change in voltage is utilized as the output signal. The polarity of this voltage change depends upon which of the two diodes switches.

The present invention is advantageously used as a regenerator in a differentially-coherent phase modulation, PCM transmission system, as will be explained in greater detail hereinbelow.

It is a particular advantage of the present invention that the functions of detection and regeneration can be combined in a single detector-regenerator stage. As a result, the high frequency alternating current signal being regenerated need not first be detected before being applied to the regenerator, as is the current practice. This results not only in a simplification of the instrumentation, but improves the sensitivity of the device.

These and other objects and advantages, the nature of the present invention, and its various features, will appear more fully upon consideration of the various illustrative embodiments now to be described in detail in connection with the accompanying drawings.

*Detailed description*

Figure 1:
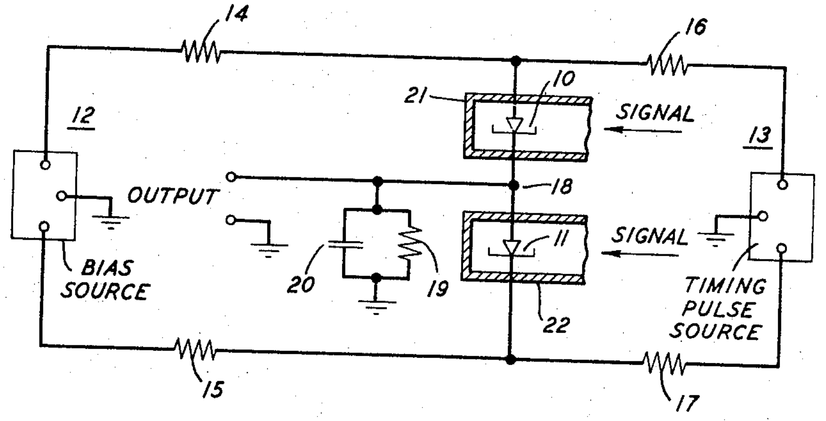
FIG. 1 is an illustrative embodiment of a majority power sensor in accordance with the invention.

Referring to the drawings, FIG. 1 shows a first embodiment of a majority power sensor, in accordance with the present invention, comprising a pair of series-connected diodes 10 and 11 located in waveguides 21 and 22, respectively; a balanced bias source 12; and a balanced timing pulse source 13. The diodes, which are connected series-aiding, are coupled to bias source 12 through resistors 14 and 15. Similarly, pulse source 13 is coupled to the diodes through a second pair of resistors 16 and 17.

Means are provided for extracting an output signal between ground and the junction 18 common to the two diodes 10 and 11. In addition, a resistor 19 and a capacitor 20 are connected between junction 18 and ground to provide, respectively, a direct current path and a high frequency bypass therebetween.

In the illustrative embodiment of the invention shown in FIG. 1, the two diodes are located in signal paths represented by the two waveguide segments 21 and 22. The reference to waveguides, however, is understood to be by way of illustration only. The specific details of the high frequency signal path in which the diodes are located would, of course, depend upon the frequency of the high frequency signal, and other properties of the system, as will be explained hereinbelow.

An exact and accurate explanation of the operation of the circuit shown in FIG. 1 is complicated by the fact that it involves a consideration of transient effects. Accordingly, the explanation which follows is only approximate. Nevertheless, it does illustrate the basics of the circuit, and, hence is believed to be useful.

Figure 2:
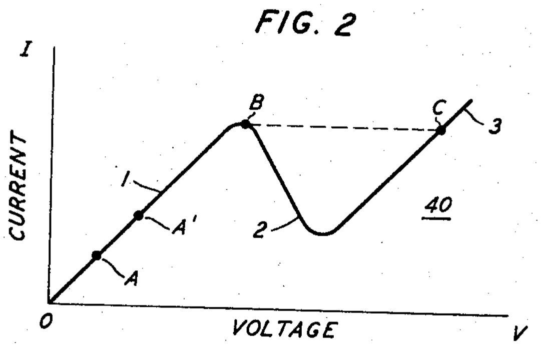
FIG. 2, included for purposes of explanation, shows the current-voltage characteristic of the diodes used in the embodiment of FIG. 1.

In the regenerative detector embodiment, the diodes, which are connected series-aiding, are characterized by a current-voltage curve 40 of the general type illustrated in FIG. 2. This curve includes a first positive resistance region 1, a negative resistance region 2, and a second positive resistance region 3. In accordance with the present invention, the diodes are biased by source 12 at a point A located within the first positive resistance region 1.

The timing pulses have a polarity and amplitude to drive the operating point of both diodes towards the upper knee of curve 40, indicated by point B. However, if a high frequency signal is simultaneously applied to one of the diodes 10, its operating point is displaced along curve 1 to a new operating point A', nearer to point B, whereas the operating point of diode 11 remains at point A. Consequently, with the simultaneous application of a timing pulse and the signal, the operating point of diode 10 reaches its peak current point B before the other diode 11 can reach B. This causes the voltage across diode 10 to increase suddenly to a larger value represented by point C on the second positive resistance portion 3 of curve 40. This sudden switch in the operating point of diode 10 is accompanied by a sudden drop in the voltage across diode 11, which drop prevents diode 11 from switching, and produces a negative pulse at the output terminals.

In a similar fashion, if the high frequency signal is applied to diode 11, it will switch, producing a positive output pulse. More generally, when high frequency signals are applied to both diodes, the diode receiving the larger signal switches. The polarity of the resulting output pulse is thus indicative of which of the two signals is larger.

It should be emphasized again, that the action of the circuit is more complicated than that described above, and that the description given is intended only as an approximate explanation of its operation.

As indicated hereinabove, the present invention is particularly useful as a regenerator in a differentially-coherent phase modulation PCM transmission system. In such a system, coding is accomplished by having one of the binary states represented by a difference in phase between successive pulses, and the other binary state represented by successive pulses having the same phase. These states are called "change" and "same." Thus, the phase of any given pulse has no significance in and of itself, but only as it relates to the phase of its immediate predecessor. Typically, pulses are either in phase or 180 degrees out of phase.

The detection of "change" or "same" is accomplished by dividing the high frequency signal into two components in two separate wavepaths by means of a 3 db hybrid junction, delaying the signal in one path exactly one time slot, and then recombining the delayed pulse with the next successive pulse in a second 3 db junction. This is illustrated in the block diagram of FIG. 3, which shows a differential phase detector and regenerator including a pair of 3 db hybrid junctions 41 and 44 connected together by the two wavepaths 4 and 5. One of the wavepaths 5 includes a one time slot delay network 42, and a phase shifter 43. The output from hybrid junction 44 is coupled to a majority power sensor 45.

Depending upon whether the signals in adjacent time slots are "same" or "changed," signal energy is coupled to one of the diodes 48 or 49 of sensor 45 through either branch 46 or 47 of junction 44. This results in the production by sensor 45 of positive and negative output pulses, depending upon the signal content. Thus, in this application, the majority power sensor of FIG. 1 operates as a detector-regenerator, reproducing at its output the original modulating intelligence.

Figure 3:
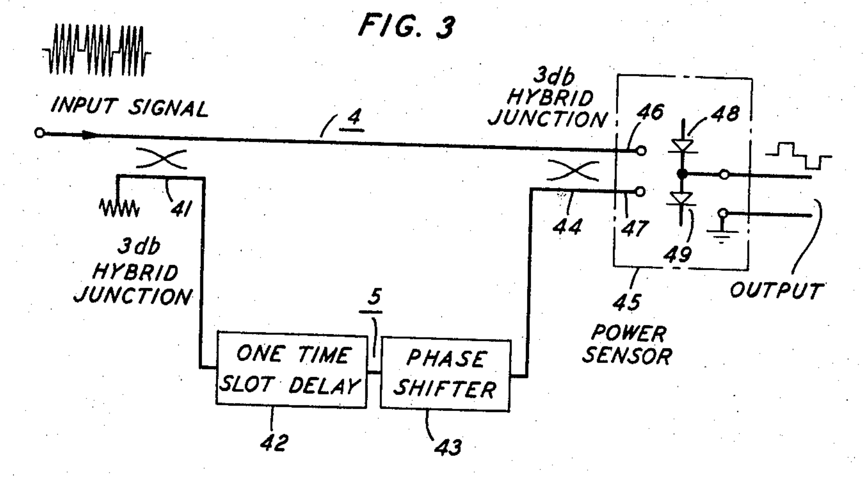
FIG. 3 shows the sensor of FIG. 1 used as a regenerative detector in a differential phase detector and regenerator circuit.
Figure 4:
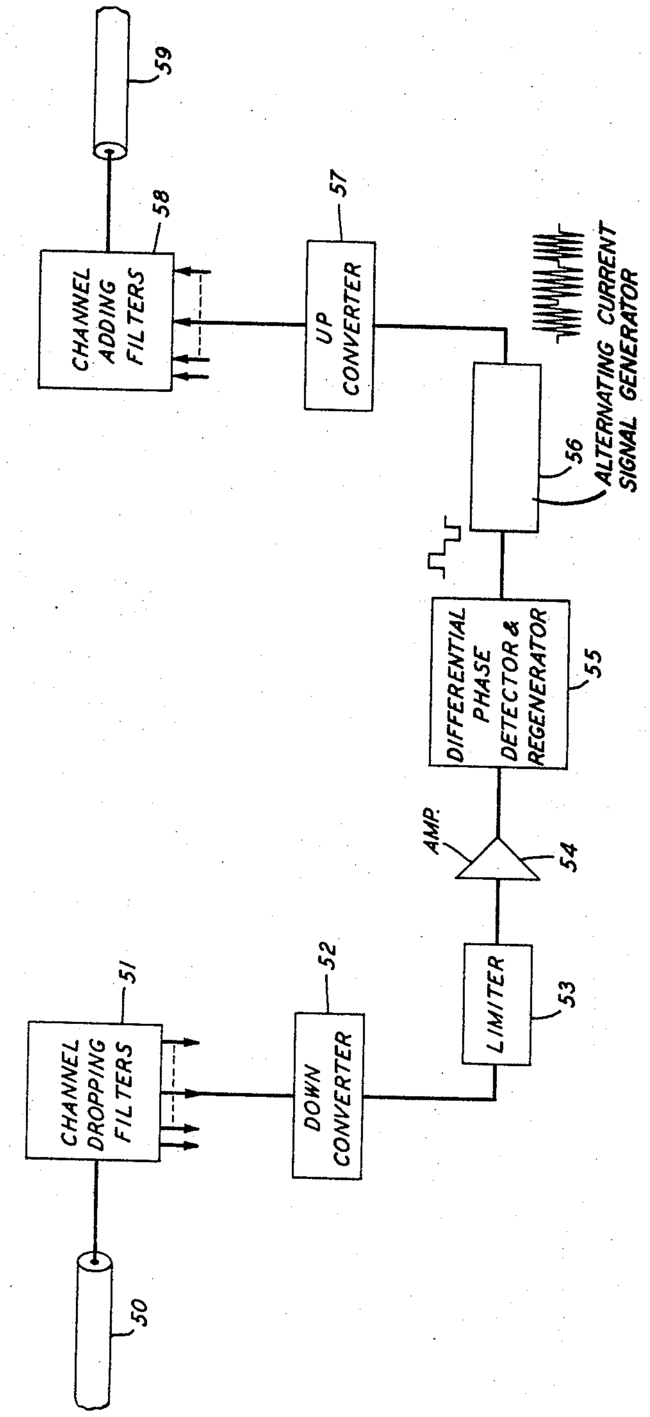
FIG. 4 shows a regenerative repeater using the regenerative detector of FIG. 3.

FIG. 4 shows the present invention employed as a regenerative detector in a typical regenerative repeater. In this application the input signal, received from transmission line 50, is passed through a channel dropping filter 51 wherein the several channels normally present are separated for individual processing. One of these channels, as illustrated in FIG. 4, is passed through a down-converter 52, a limiter 53, an amplifier 54 and a differential phase detector and regenerator 55. The latter stage is as illustrated in FIG. 3, and is used to modulate an alternating current signal generator 56, whose output consists of pulses of high frequency energy whose relative phases are determined by the polarity of the driving pulses. The high frequency pulses are passed through an up-converter 57 and recombined in a channel adding filter 58 with other channels that had been similarly operated upon. The composite signal is then coupled to a transmission line 59 for further transmission and utilization.

As was explained above, in a majority power sensor in accordance with the invention, it is the change in state of one of two diodes which determines the state of the other diode. Consequently, the rate at which a regenerative detector can be made to operate is dependent upon how quickly the two diodes can communicate with each other. Advantageously, this interaction time, *t*, between the two diodes should be less than about $\frac{1}{20}$ of the time interval between possible signal changes. In a PCM system, this time interval is equal to the duration T of a time slot. Since the information handling ability of a PCM system is measured by its bit rate, which is equal to $1/T$, increasing the bit rate requires a corresponding decrease in the interaction time.

Figure 5:
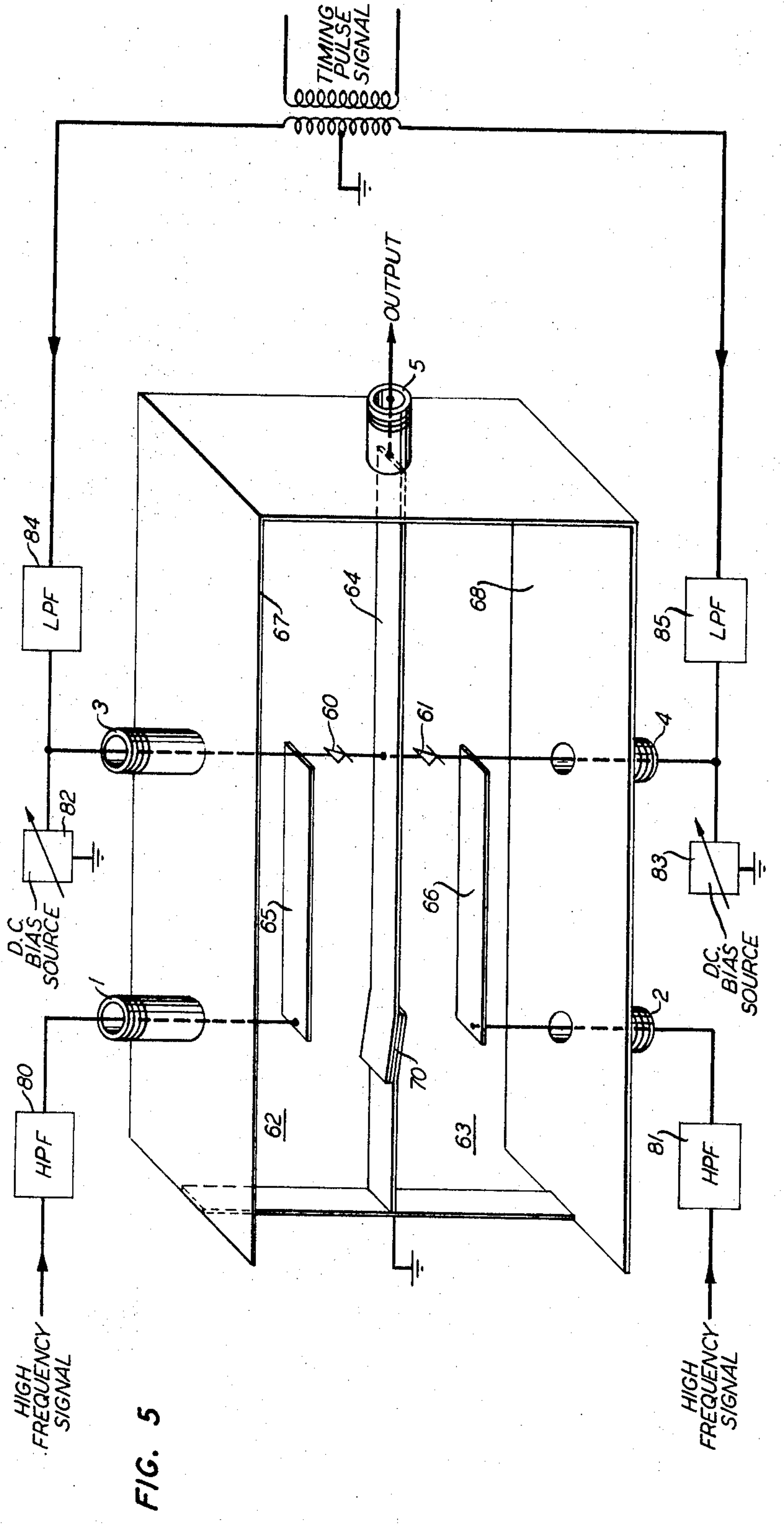
FIG. 5 shows an alternate embodiment of a majority power sensor in accordance with the invention.

It has been determined that one of the more important factors determining the interaction time is the physical distance between the two diodes. In particular, it has been found that, advantageously, this distance should be minimized. FIG. 5 is illustrative of an alternative embodiment of the invention adapted for operation at bit rates of the order of 320 megabits per second. In this embodiment each of the two diodes 60 and 61 is mounted between an inner conductor and an outer conductor of one of two balanced strip transmission lines 62 and 63, respectively, in a manner to minimize the diode-to-diode spacing. Specifically, each of these two lines comprises an inner conductor 65, 66 and a pair of outer conductors 67 and 64, and 68 and 64, of which outer conductor 64 is shared in common by the two transmission lines. Each diode is connected between on of the inner conductors 65 or 66 and common conductor 64.

With respect to the timing signal and to the output signal, signal, the common conductor 64 is at ground potential, being grounded to the other outer conductors 67 and 68 through capacitor 70. Thus, the two high frequency signals to be compared are independently coupled, by way of input ports 1 and 2, to a pair of strip transmission lines 62 and 63. Each of lines is separately terminated by means of one of the diodes 60 or 61.

With respect to the timing signal and the output signal, however, common conductor 64 is not at ground potential due to the relatively high impedance of capacitor 70 at these lower frequencies. Similarly, inner conductors 65 and 66 are essentially open-circuited with respect to these lower frequency signals due to the presence of high pass filters 80 and 81 in the high frequency signal paths connected to ports 1 and 2. Thus, with respect to the timing signals, which are coupled into the power sensor through ports 3 and 4, the two diodes 60 and 61 are connected series-aiding.

The outputpulses, which, in a regenerative detector are the regenerated baseband pulses, are coupled to output port 5 by means of a balanced strip transmission line formed by conductor 64 which is now an inner conductor, and the two outer ground conductors 67 and 68.

Also shown in FIG. 5 are the two direct current bias sources 82 and 83, for biasing the diodes, and the low pass filters 84 and 85 for isolating the timing circuit from the high frequency signal circuit.

In all other respects the embodiment of FIG. 5 is the equivalent of that shown in FIG. 1, and operates in the same manner.

It is understood that the use of the majority power sensor of FIGS. 1 and 5 as regenerative detectors, and the specific embodiments described hereinabove, are only intended to be illustrative.

Each of the embodiments of FIG. 1 or FIG. 5 can also be used as a simple differential detector, in which the output signal is a measure of the instantaneous difference in the power of the two high frequency signals. In this latter application, no timing signal pulses are required, and the diodes need not have a negative resistance region in their current voltage characteristics.. In operation, the two high frequency signals are coupled to the diodes wherein they are detected and produce an output signal that varies in accordance with the difference between the powers of the two input signals. The polarity of the output signal is determined by which of the two input signals is larger. Thus, in all cases it is understood that the above-described arrangements are illustrative of but a few of the many possible specific embodiments which can represent applications of the principles of the invention. Numerous and varied other arrangements can readily be devised in accordance with these principles by those skilled in the art without departing from the spirit and scope of the invention.

I claim:

1. In combination:
a pair of diodes each of which is characterized by a current-voltage curve having a first positive resistance region, a negative resistance region, and a second positive resistance region;
said diodes being connected together series-aiding forming a junction therebetween;
means for simultaneously forward biasing both of said diodes to an operating point within said first positive resistance region;
pulsing means connected to said diodes for increasing the forward bias across each of said diodes;
means for applying alternating current wave energy to each of said diodes;
and means for extracting output pulses at the junction of said diodes.

2. Thet combination according to claim 1 wherein said means for applying alternating current signal energy to said diodes includes:
a first hybrid junction for dividing said signal energy into two equal components for propagation along two separate wavepaths;
means for delaying one of said components a specified period of time relative to the other of said components;
a second hybrid junction for recombining the components of wave energy propagating along said two wavepaths;
and means for coupling said recombined wave energy to said diodes.

3. The combination according to claim 1:
wherein said means for applying alternating current wave energy to each of said diodes includes a pair of balanced strip transmission lines;
each of said lines having an inner conductor and a pair of outer conductors, one of which is shared in common by both of said lines;
wherein each of said diodes is connected between the inner conductor of one of said lines and said common conductor;
low impedance capacitive means at the frequency of said wave energy for coupling said common conductor to the other of said outer conductors;
and wherein said output means are connected between said common conductor and said other outer conductors.

4. In combination:
a pair of balanced strip transmission lines;
each of said lines having an inner conductor and a pair of outer conductors, one of which is shared in common by both of said lines;
low impedance capacitive means for coupling said common conductor to the other of said outer conductors;
a pair of series-aiding connected diodes, each of which is connected between one of said inner conductors and said common outer conductor;
means for applying alternating current wave energy to each of said diodes;
and output means connected between said common conductor and said other outer conductors.

5. The combination according to claim 1 including, in addition, an alternating current signal generator;
and wherein said output pulses are coupled to said signal generator in a manner to phase modulate the alternating current signal derived therefrom.

References Cited

UNITED STATES PATENTS 3,319,085 5/1967 Cooperman ---------- 307—286

AUTHOR GAUSS, *Primary Examiner.*

J. ZAZWORSKY, *Assistant Examiner.*

U.S. Cl. X.R.

178—70; 307—286, 268; 329—104, 205; 332—11; 333—84